United States Patent
Takaichi et al.

(10) Patent No.: US 9,908,255 B2
(45) Date of Patent: Mar. 6, 2018

(54) APPARATUS AND METHOD FOR MANUFACTURING MAGNET SEGMENTS CONSTITUTING FIELD POLE MAGNETIC BODY

(71) Applicant: NISSAN MOTOR CO., LTD., Yokohama-shi, Kanagawa (JP)

(72) Inventors: Kazuhiro Takaichi, Yokohama (JP); Kimio Nishimura, Yokohama (JP); Hideki Watanabe, Sagamihara (JP); Takashi Sekikawa, Yokohama (JP); Yasushi Matsushita, Yokohama (JP); Akihisa Hori, Yokohama (JP); Takumi Ohshima, Yokohama (JP); Michito Kishi, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/411,715

(22) PCT Filed: Jun. 12, 2013

(86) PCT No.: PCT/JP2013/066202
§ 371 (c)(1),
(2) Date: Dec. 29, 2014

(87) PCT Pub. No.: WO2014/007038
PCT Pub. Date: Jan. 9, 2014

(65) Prior Publication Data
US 2015/0158197 A1    Jun. 11, 2015

(30) Foreign Application Priority Data
Jul. 2, 2012 (JP) .................. 2012-148318

(51) Int. Cl.
*B26F 3/02* (2006.01)
*B26F 3/00* (2006.01)
(Continued)

(52) U.S. Cl.
CPC ............ *B26F 3/002* (2013.01); *B23D 31/002* (2013.01); *B23D 33/08* (2013.01);
(Continued)

(58) Field of Classification Search
CPC . B26F 3/002; B26F 3/00; B23D 33/08; B23D 31/002; H02K 1/27; H02K 15/03;
(Continued)

(56) References Cited

U.S. PATENT DOCUMENTS 5,069,195 A * 12/1991 Barozzi ................ B28D 5/0023
125/23.01
5,475,196 A * 12/1995 Lisec .................... C03B 33/078
219/121.39

(Continued)

FOREIGN PATENT DOCUMENTS

| | | |
|---|---|---|
| CN | 102171908 A | 8/2011 |
| JP | 2009-142081 A | 6/2009 |
| JP | 2010-259231 A | 11/2010 |

*Primary Examiner* — Ghassem Alie
*Assistant Examiner* — Bharat C Patel
(74) *Attorney, Agent, or Firm* — Foley & Lardner LLP

(57) ABSTRACT

An apparatus for manufacturing magnet segments constituting a field pole magnetic body formed by cleaving a magnetic body at a plurality of scheduled cleaving parts is provided. The apparatus includes placing tables on which a magnetic body having a coating applied to an outer surface thereof is placed, a pressing unit that cleaves the magnetic body by pressing the magnetic body from an opposite side of an incision at a scheduled cleaving part arranged between two of the placing tables, and a cutting unit that cuts the coating of the magnetic body present at the scheduled cleaving part after the magnetic body is cleaved, by applying (Continued)

a moment in a direction opposite to a moment generated in the magnetic body between the two placing tables at the time of cleaving. Cleaving divides the magnetic body into a magnet segment and an uncleaved magnetic body.

9 Claims, 20 Drawing Sheets

(51) Int. Cl.
 B65H 35/10 (2006.01)
 H02K 15/03 (2006.01)
 H01F 41/02 (2006.01)
 B23D 31/00 (2006.01)
 B23D 33/08 (2006.01)
 B26D 7/02 (2006.01)
 B26D 7/14 (2006.01)

(52) U.S. Cl.
 CPC ......... *H01F 41/0253* (2013.01); *H02K 15/03* (2013.01); *B26D 7/02* (2013.01); *B26D 7/14* (2013.01); *Y10T 225/14* (2015.04); *Y10T 225/201* (2015.04)

(58) Field of Classification Search
 CPC . H01F 41/0253; Y10T 225/201; Y10T 225/14
 USPC ..... 225/1–3, 7, 105, 96.5; 29/607, 609, 417, 29/426.2, 598; 72/381–383
 See application file for complete search history.

(56) References Cited

U.S. PATENT DOCUMENTS

| | | | | |
|---|---|---|---|---|
| 5,699,613 A * | 12/1997 | Chong | ................... | H01L 21/486 174/264 |
| 5,881,611 A * | 3/1999 | Wagner | ................. | B26F 1/3846 264/153 |
| 6,513,694 B1 * | 2/2003 | Xu | ....................... | B28D 5/0011 125/23.01 |
| 7,404,908 B2 * | 7/2008 | Yamaoka | ............... | H05K 3/427 216/18 |
| 7,586,226 B2 * | 9/2009 | Kihara | ................. | H02K 1/2786 310/153 |
| 7,906,881 B2 * | 3/2011 | Enomoto | ............... | H02K 1/278 310/156.43 |
| 8,497,613 B2 | 7/2013 | Nakamura et al. | | |
| 8,819,921 B2 * | 9/2014 | Adachi | ................. | H01F 7/0221 29/417 |
| 2006/0257793 A1 * | 11/2006 | Koizumi | ................ | H05K 3/427 430/315 |
| 2006/0261117 A1 * | 11/2006 | Konrad | ............... | B28D 5/0011 225/2 |
| 2007/0158381 A1 * | 7/2007 | Lisec | .................... | C03B 33/033 225/2 |
| 2008/0006669 A1 * | 1/2008 | Stangl | ..................... | C03B 33/06 225/2 |
| 2010/0244608 A1 * | 9/2010 | Nakamura | ................ | H01F 1/08 310/156.38 |
| 2012/0036696 A1 * | 2/2012 | Murakami | ............ | H01F 7/0221 29/426.2 |

* cited by examiner

APPARATUS AND METHOD FOR MANUFACTURING MAGNET SEGMENTS CONSTITUTING FIELD POLE MAGNETIC BODY

TECHNICAL FIELD

The prevent invention relates to an apparatus and a method for manufacturing magnet segments constituting a field pole magnetic body to be arranged in a permanent magnet rotary electric machine.

BACKGROUND ART

A field pole magnetic body formed by dividing a plate-like magnetic body (hereinafter, merely referred to as a "magnetic body") into a plurality of magnet segments and bonding these plurality of magnet segments to each other is known as a field pole magnetic body to be arranged in a rotor core of a permanent magnet embedded rotary electric machine. Since such a field pole magnetic body is formed of a plurality of magnet segments, the volumes of the individual magnet segments can be reduced and eddy currents generated in the magnet segments due to a variation of a magnetic field caused by the rotation of a rotor can be reduced. This can suppress heat generation of the field pole magnetic body associated with the generation of the eddy currents and prevent irreversible thermal demagnetization.

It is disclosed in JP2009-142081A to manufacture a plurality of magnet segments by placing a magnetic body on which incisions are made along scheduled cleaving lines on dies for supporting the magnetic body on opposite end parts in a direction perpendicular to the scheduled cleaving lines and pressing the magnetic body at the scheduled cleaving line downwardly from above by a punch, thereby cleaving the magnetic body along the scheduled cleaving line.

SUMMARY OF INVENTION

The magnet segment cleaved as described above is clamped by carrying claws from opposite widthwise sides of the magnetic body and conveyed in a direction away from the uncleaved magnetic body. Here, a coating is applied to the magnetic body in advance to suppress rusting, deterioration and the like. The coating is cut along the incision when the magnetic body is cleaved, but remains without being cut on a surface of a side where incisions are not made.

This may cause only the coating part not to be cut and the uncleaved magnetic body to be also conveyed together with the magnet segment during the conveyance of the magnet segment after cleaving when the magnetic body is cleaved along the scheduled cleaving line. In this case, a conveyance failure is determined and a production facility is temporarily stopped.

The present invention aims to provide an apparatus for manufacturing magnet segments constituting a field pole magnetic body which apparatus can cut a coating when the magnetic body is cleaved.

According to one aspect of the present invention, an apparatus is provided which manufactures magnet segments constituting a field pole magnetic body by cleaving a magnetic body having a coating applied to outer surfaces at a plurality of scheduled cleaving parts. This manufacturing apparatus includes placing tables on which the magnetic body is to be placed, a pressing unit adapted to cleave the magnetic body by pressing the magnetic body at the scheduled cleaving part arranged between two placing tables, and a cutting unit adapted to cut the coating present at the scheduled cleaving part pressed by the pressing unit after the magnetic body is cleaved.

According to another aspect of the present invention, a method is provided which manufactures magnet segments constituting a field pole magnetic body by cleaving a magnetic body having a coating applied to outer surfaces at a plurality of scheduled cleaving parts. This manufacturing method includes cleaving the magnetic body by pressing the magnetic body at the scheduled cleaving part arranged between two placing tables on which the magnetic body is placed, and cutting the coating present at the scheduled cleaving part pressed when the magnetic body is cleaved after the magnetic body is cleaved.

Embodiments and advantages of the present invention are described in detail below with reference to the accompanying drawings.

DESCRIPTION OF EMBODIMENTS

Hereinafter, embodiments of the present invention are described in detail with reference to the drawings.

A first embodiment is described.

Figure 1A:
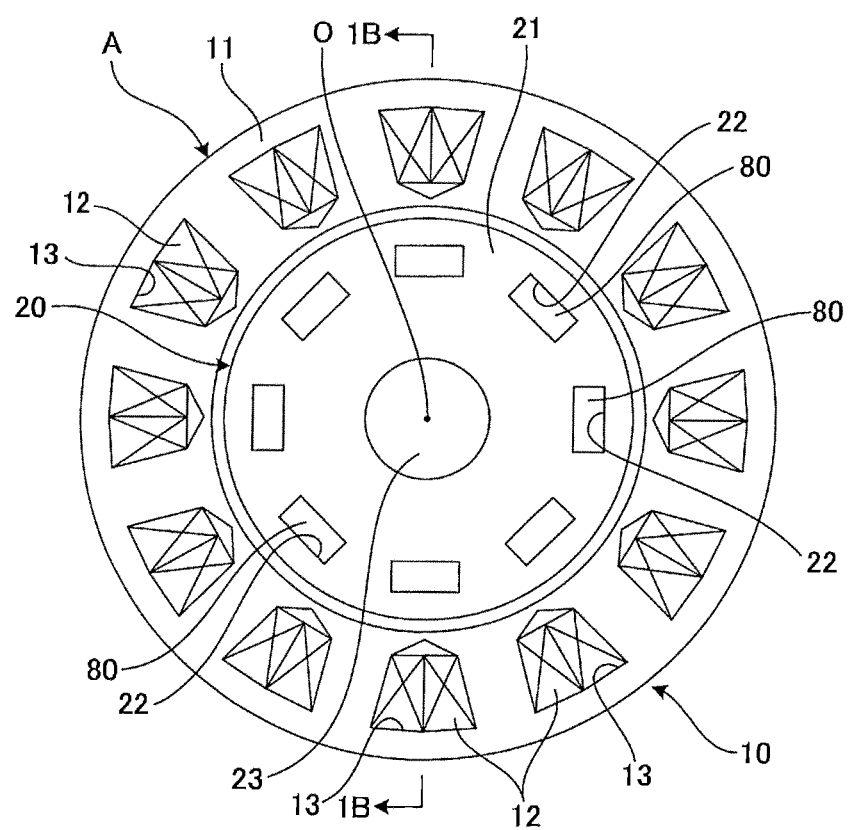
FIG. 1A is a schematic configuration diagram showing the configuration of a main part of a permanent magnet rotary electric machine to which a field pole magnetic body composed of magnet segments manufactured by a manufacturing apparatus according to an embodiment is applied.
Figure 1B:
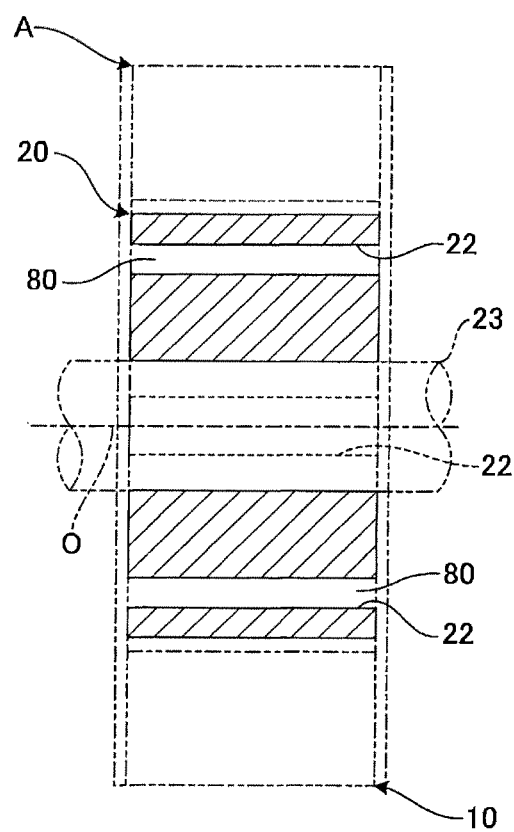
FIG. 1B is a sectional view showing a cross-section along 1B-1B of the permanent magnet rotary electric machine of FIG. 1A.

FIG. 1A and FIG. 1B showing a cross-section along 1B-1B of FIG. 1A show a permanent magnet embedded rotary electric machine A (hereinafter, merely referred to as the "rotary electric machine A") to which a field pole magnetic body 80 composed of magnet segments manufactured by a manufacturing apparatus in the present embodiment is applied.

The rotary electric machine A is composed of a stator 10 having a circular ring shape and constituting a part of a casing, and a cylindrical rotor 20 arranged coaxially with this stator 10.

The stator 10 is composed of a stator core 11 and a plurality of coils 12, and the plurality of coils 12 are housed in slots 13 formed at equal angular intervals on the same circumference centered on an axis center O on the stator core 11.

The rotor 20 is composed of a rotor core 21, a rotary shaft 23 which integrally rotates with the rotor core 21 and a plurality of field pole magnetic bodies 80, and the plurality of field pole magnetic bodies 80 are housed in slots 22 formed at equal angular intervals on the same circumference centered on the axis center O.

Figure 2:
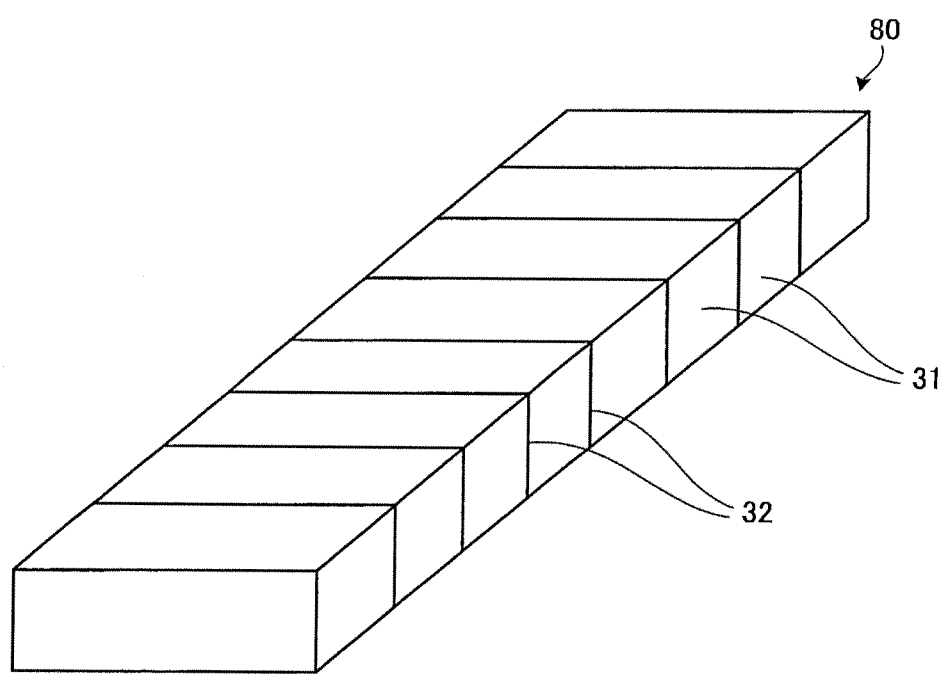
FIG. 2 is a configuration diagram showing the configuration of the field pole magnetic body.

The field pole magnetic body 80 housed in the slot 22 of the rotor 20 is formed as an aggregate of magnet segments 31 in which a plurality of magnet segments 31 are aligned in a row as shown in FIG. 2. The magnet segments 31 are manufactured by cleaving a plate-like magnetic body 30 (FIG. 3A) having upper and lower surfaces having a rectangular shape along a shorter side direction of the rectangular shape. The field pole magnetic body 80 is formed by bonding cleaved surfaces of the plurality of divided magnet segments 31 by resin 32. The used resin 32 is, for example, UV curing adhesive, two-liquid room temperature curing adhesive or the like and electrically insulates the adjacent magnet segments 31 from each other. In this way, eddy currents generated in the magnet segments 31 due to a variation of an acting magnetic field can be reduced by being retained in the individual magnet segments 31 and irreversible thermal demagnetization can be prevented by suppressing heat generation of the field pole magnetic body 80 associated with the eddy currents.

Figure 3A:
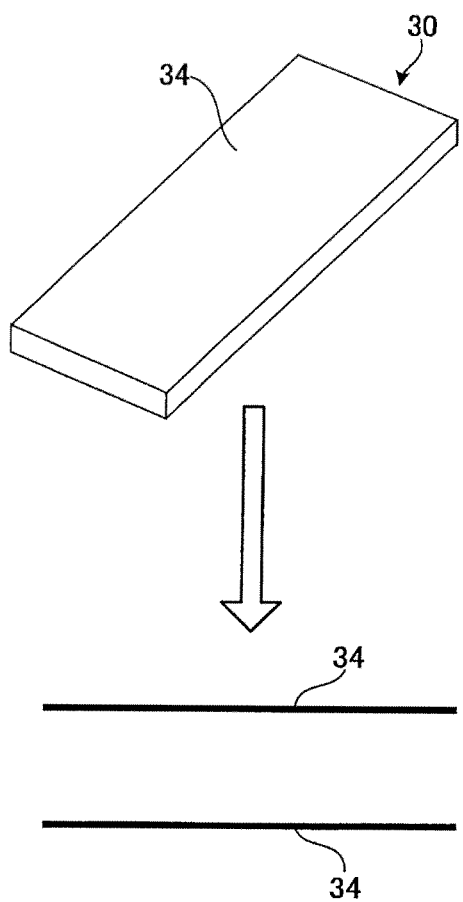
FIG. 3A is a diagram showing a coating of the magnetic body.

Next, a process of manufacturing the plurality of magnet segments 31 from the plate-like magnetic body 30 is described with reference to FIGS. 3A to 3C.

The plate-like magnetic body 30 is formed by applying machining after a raw material is molded and sintered. A coating 34 is applied to outer surfaces of this magnetic body 30 for the purpose of suppressing deterioration such as rusting (FIG. 3A).

Figure 3B:
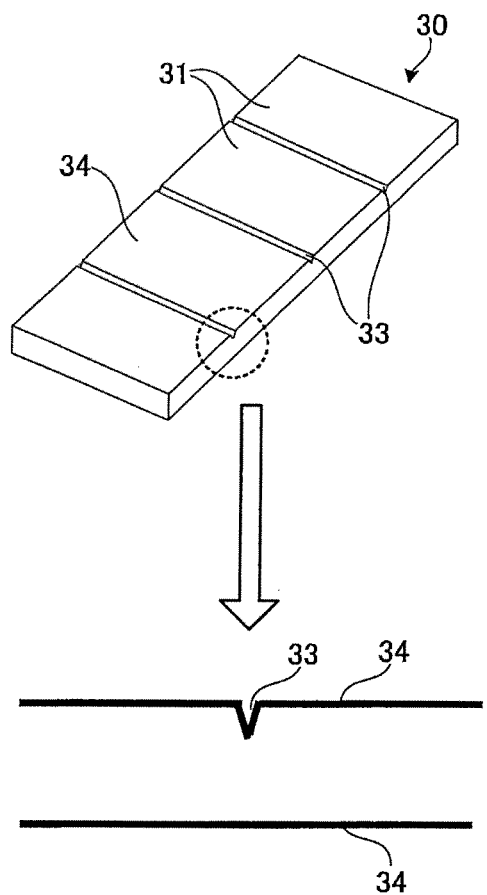
FIG. 3B is a diagram showing grooving of the magnetic body.

Subsequently, incisions 33 are formed at positions where the magnetic body 30 is scheduled to be cleaved (FIG. 3B). The flatness of cleaved surfaces 35 when the magnetic body 30 is cleaved into the magnet segments 31 is improved as the depths of the formed incisions 33 from the surface increase and as the tips of the incisions 33 become more pointed.

The incisions 33 are formed, for example, by machining such as dicing or slicing, laser processing, wire cut discharge machining or the like. In forming the incisions 33, the coating 34 applied to the surface of the magnetic body 30 is simultaneously cut.

Figure 3C:
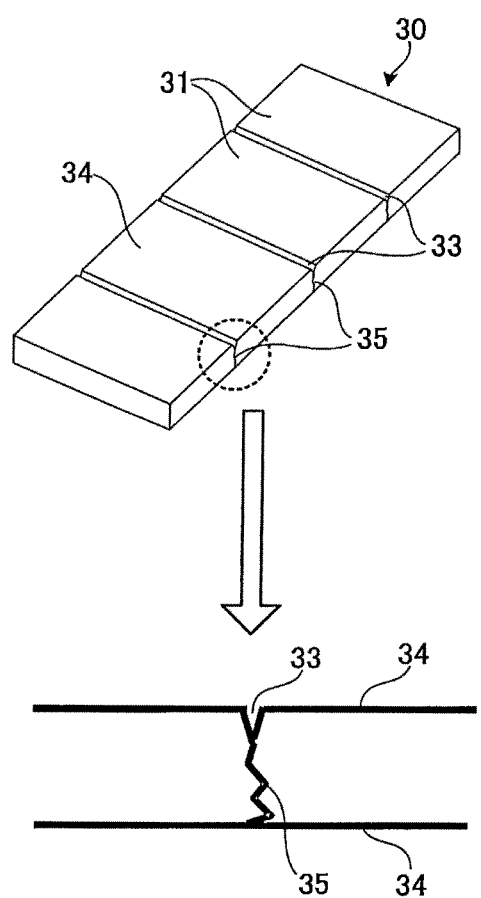
FIG. 3C is a diagram showing cleaving of the magnetic body.

Subsequently, the magnetic body 30 is cleaved along the incisions 33 by pressing a side of the magnetic body 30, where the incisions 33 are not formed, at positions corresponding to the incisions 33 downwardly by a punch to be described later with the incisions 33 facing down, whereby the cleaved surfaces 35 are formed to obtain a plurality of magnet segments 31 (FIG. 3C).

Figure 4A:
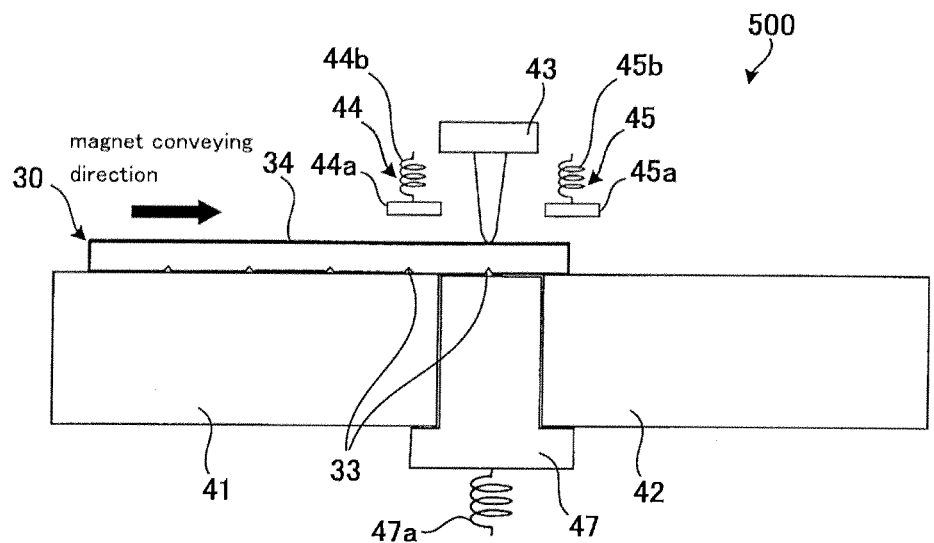
FIG. 4A is a diagram showing a cleaving process of a magnet segment manufacturing apparatus in a comparative example.
Figure 4B:
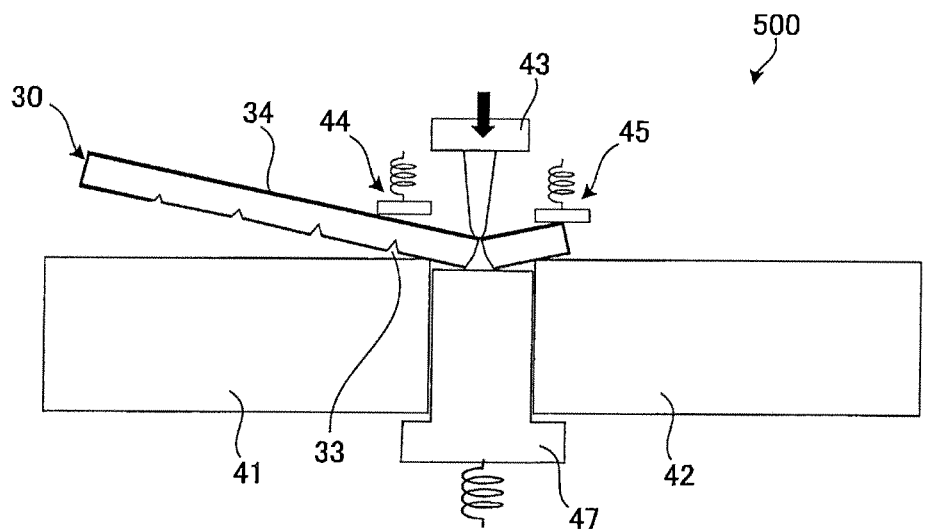
FIG. 4B is a diagram showing the cleaving process of the magnet segment manufacturing apparatus in the comparative example.
Figure 5A:
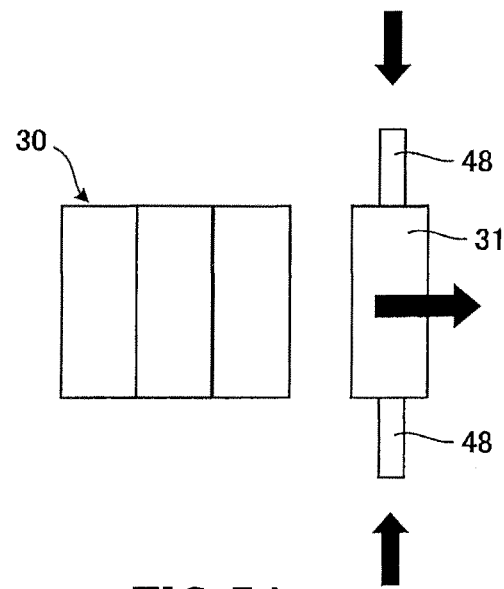
FIG. 5A is a diagram showing the conveyance of a magnet segment after cleaving in the comparative example.
Figure 5B:
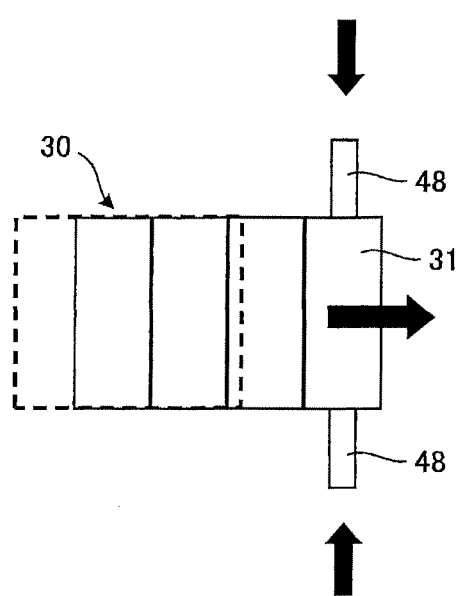
FIG. 5B is a diagram showing the conveyance of the magnet segment after cleaving in the comparative example.

FIGS. 4A and 4B are configuration diagrams schematically showing a magnet segment manufacturing apparatus 500 in a comparative example for performing the cleaving process shown in FIG. 3C. FIGS. 5A and 5B are diagrams showing a state of the magnetic body 30 viewed from above to explain the conveyance of the magnet segment 31 after cleaving in the comparative example.

The magnet segment manufacturing apparatus 500 is an apparatus in which the magnetic body 30 is fixed in a state bridging between a pair of dies 41, 42 and a punch 43 is lowered to the bridging part from above to cleave the magnetic body 30 by three-point bending. The magnet segment manufacturing apparatus 500 includes the pair of dies 41, 42 as lower dies on which the magnetic body 30 is to be placed in a bridging state, the punch 43 which cleaves the magnetic body 30 by pressing the bridging part of the magnetic body 30, magnet pressers 44, 45 which are arranged above the pair of dies 41, 42 and at opposite sides of the punch 43 and vertically move together with the punch 43, and a die cushion 47 which is arranged between the pair of dies 41, 42 and is constantly biased upwardly by a spring 47a.

The punch 43 cleaves the magnetic body 30 by pressing the upper surface of the magnetic body 30 bridging between the pair of dies 41, 42 downwardly. The punch 43 is so positioned that a tip is located between the pair of dies 41, 42 and driven in a vertical direction, for example, by a servo press, a machine press, a hydraulic press or the like.

The magnet presser 44, 45 is composed of a plate-like part 44a, 45a to be brought into contact with the magnetic body 30, and a spring 44b, 45b suspending the plate-like part 44a, 45a. The magnet pressers 44, 45 are lowered as the punch 43 is lowered and press the plate-like parts 44a, 45a against the magnetic body 30 by spring forces after the plate-like parts 44a, 45a are brought into contact with the magnetic body 30. The die cushion 47 is lowered against a spring force as the punch 43 presses the magnetic body 30 downwardly and elevated by the spring force when the punch 43 is returned upwardly.

The magnet segment manufacturing apparatus 500 is configured as described above and the magnetic body 30 provided with the incisions 33 is placed in a bridging state on the upper surfaces of the pair of dies 41, 42. It should be noted that the magnetic body 30 is so placed on the pair of dies 41, 42 that positions desired to be cleaved, i.e. the incisions 33 provided in advance at scheduled cleaving parts are located on a side facing toward the dies 41, 42.

Then, the magnetic body 30 is conveyed in a conveying direction, for example, using a servo mechanism and so positioned that the incision 33 as the scheduled cleaving part is located between the pair of dies 41, 42 (FIG. 4A). In this state, the punch 43 is lowered to press the underside of the incision 33 downwardly, whereby the magnetic body 30 is cleaved along the incision 33 by three-point bending of the punch 43 and the pair of dies 41, 42 (FIG. 4B).

Subsequently, the cleaved magnet segment 31 is clamped by carrying claws 48 from opposite widthwise sides of the magnetic body 30 and conveyed in the conveying direction (FIG. 5A).

When the magnetic body 30 is cleaved, the coating 34 applied to the outer surface of the magnetic body 30 may be left without being cut as shown in FIG. 4B. The coating 34 does not remain on the lower surface of the magnetic body 30 since it is also cut when the incisions 33 are formed. However, since no incision 33 is formed and the magnet segment 31 and the uncleaved magnetic body 30 are hardly separated during cleaving on the upper surface of the magnetic body 30, a force for cutting the coating 34 is unlikely to be exerted.

This results in a state where the cleaved magnet segment 31 and the uncleaved magnetic body 30 are connected by the coating 34. In this case, if the cleaved magnet segment 31 is clamped by the carrying claws 48 and conveyed in the conveying direction, the uncleaved magnetic body 30 is conveyed together with the magnet segment 31 (FIG. 5B). In this way, a conveyance failure occurs and a facility is temporarily stopped.

Accordingly, in the present embodiment, the coating 34 is cut by applying a moment in a direction opposite to a moment generated in the magnetic body 30 when the magnetic body 30 is cleaved after cleaving.

Figure 6A:
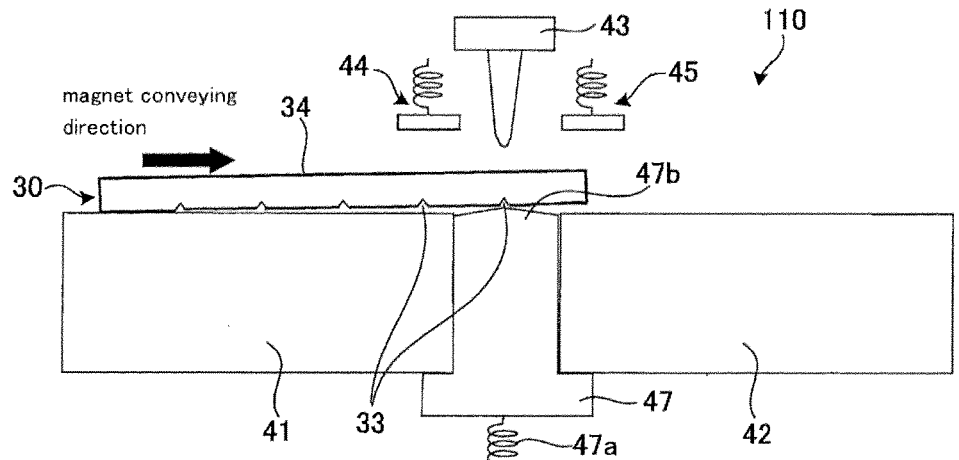
FIG. 6A is a diagram showing a cleaving process of a magnet segment manufacturing apparatus in a first embodiment.
Figure 6B:
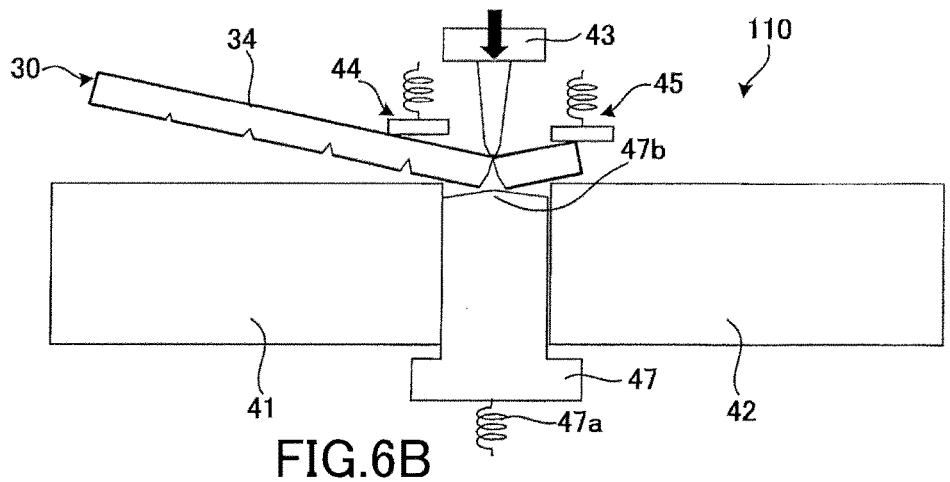
FIG. 6B is a diagram showing the cleaving process of the magnet segment manufacturing apparatus in the first embodiment.
Figure 6C:
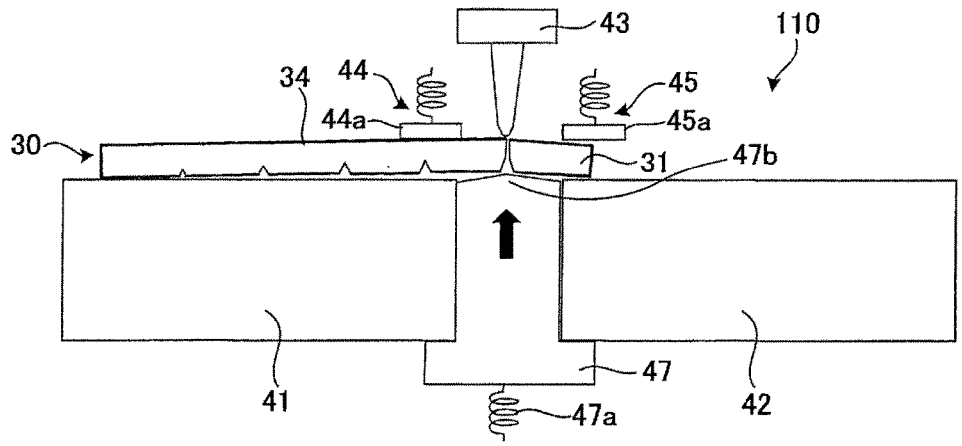
FIG. 6C is a diagram showing the cleaving process of the magnet segment manufacturing apparatus in the first embodiment.

FIGS. 6A to 6C are diagrams showing a cleaving process of a magnet segment manufacturing apparatus 110 in the present embodiment. The present embodiment is so structured that a projecting part 47b projecting upwardly is present on the upper surface of the die cushion 47.

The projecting part 47b is formed to be located in the center between the pair of dies 41, 42. That is, when the magnetic body 30 is cleaved, the incision 33 of the magnetic body 30 and the projecting part 47b of the die cushion 47 face each other. Further, a projection length of the projecting part 47b is so set that a tip projects further upwardly than the pair of dies 41, 42 when the die cushion 47 is located at an upper end position.

As shown in FIG. 6A, the magnetic body 30 is conveyed rightward in FIG. 6A until the incision 33 provided on the lower surface of the magnetic body 30 comes to be located in the center between the pair of dies 41, 42. At this time, the tip of the projecting part 47b of the die cushion 47 faces the incision 33 of the magnetic body 30.

As shown in FIG. 6B, the punch 43 is lowered to strongly press the scheduled cleaving part of the magnetic body 30. At this time, a moment for making the magnetic body 30 convex downward acts on the magnetic body 30 by three-point bending of the punch 43 and the pair of dies 41, 42 supporting the magnetic body 30, thereby causing a crack from the incision 33 to an upper side to cleave the magnetic body 30. Further, the die cushion 47 is retracted downwardly by a downward pressing force of the punch 43. At this point of time, the magnetic body 30 is cleaved, but the coating 34 is not cut yet.

When the die cushion 47 temporarily lowered is elevated by the spring force as shown in FIG. 6C, the tip of the projecting part 47b of the die cushion 47 presses the cleaving part of the magnetic body 30 upwardly. At this time, since the plate-like parts 44a, 45a of the magnet pressers 44, 45 lowered together with the punch 43 are pressed at two points on the upper surface of the magnetic body 30 and at opposite sides of the punch 43, a force caused by three-point bending of the tip of the projecting part 47b of the die cushion 47 and the two magnet pressers 44, 45 act on the magnetic body 30, whereby a moment for making the magnetic body 30 convex upward acts on the magnetic body 30.

In this way, a force acts on the upper end of the cleaving part of the magnetic body 30 in a direction to pull apart a part of the coating 34 on the upper surface of the magnet segment 31 and a part thereof on the upper surface of the uncleaved magnetic body 30, and the coating 34 is cut along the scheduled cleaving part.

Figure 7A:
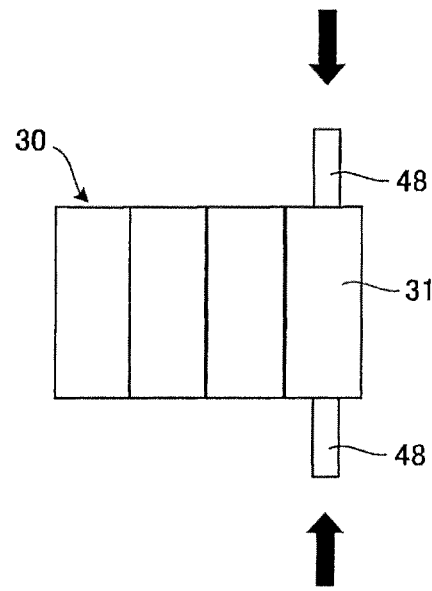
FIG. 7A is a diagram showing the conveyance of a magnet segment after cleaving in the first embodiment.
Figure 7B:
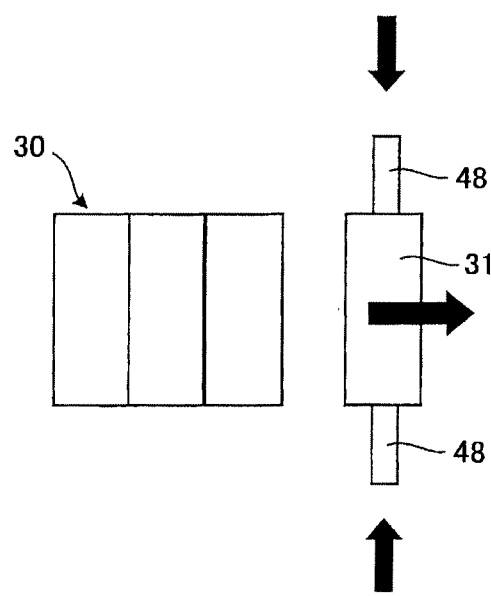
FIG. 7B is a diagram showing the conveyance of the magnet segment after cleaving in the first embodiment.

Thereafter, the cleaved magnet segment 31 is clamped by the carrying claws 48 from the opposite sides of the magnetic body 30 as shown in FIG. 7A and conveyed in the conveying direction as shown in FIG. 7B.

As just described, the magnet segment 31 can be separated from the uncleaved magnetic body 30 before conveyance since the magnet segment 31 is conveyed after the coating 34 on the upper surface of the magnetic body 30 is cleaved after the cleaving of the magnetic body 30. Thus, it can be prevented that the production facility is temporarily stopped due to a conveyance failure of the magnet segment 31.

Further, since the moment in the direction opposite to the moment generated in the magnetic body 30 at the time of cleaving is applied after cleaving, the conveyance failure can be prevented by more reliably cutting the coating 34.

Further, since the projecting part 47b projecting upward is provided on the upper surface of the die cushion 47 biased upwardly by the spring 47a, the cleaving part can be pressed upwardly by the projecting part 47b of the die cushion 47 after the punch 43 is lowered and the magnetic body 30 is cleaved. Thus, the moment in the direction opposite to the moment generated in the magnetic body 30 at the time of cleaving by three-point bending can be caused to act on the magnetic body 30, and the conveyance failure can be prevented by more reliably cutting the coating 34.

Furthermore, since the die cushion 47 operates in synchronization with vertical movements of the punch 43, a device for synchronizing the punch 43 and the die cushion 47 and power of the die cushion 47 are not required and the conveyance failure can be prevented by a simple structure.

Here, to cut the coating 34 at the time of cleaving the magnetic body 30, the moment in the direction opposite to the moment generated in the magnetic body 30 at the time of cleaving the magnetic body 30 is caused to act on the magnetic body 30 by a movement of the die cushion 47 including the projecting part 47b on the tip in FIGS. 6A to 6C. However, it is also possible to employ a magnet segment manufacturing apparatus 120 configured as follows instead of this.

In this magnet segment manufacturing apparatus 120, the upper surface of a die cushion 47 is flat as in FIG. 4A without including the projecting part 47b.

Figure 8A:
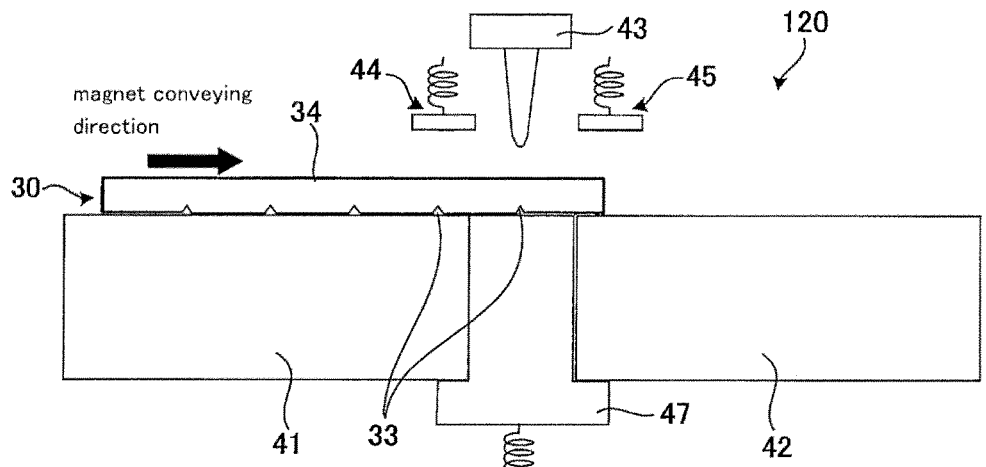
FIG. 8A is a diagram showing a cleaving process of a magnet segment manufacturing apparatus in the first embodiment.

As shown in FIG. 8A, the magnetic body 30 is conveyed rightward in FIG. 8A until the incision 33 provided on the lower surface of the magnetic body 30 comes to be located in the center between a pair of dies 41, 42.

Figure 8B:
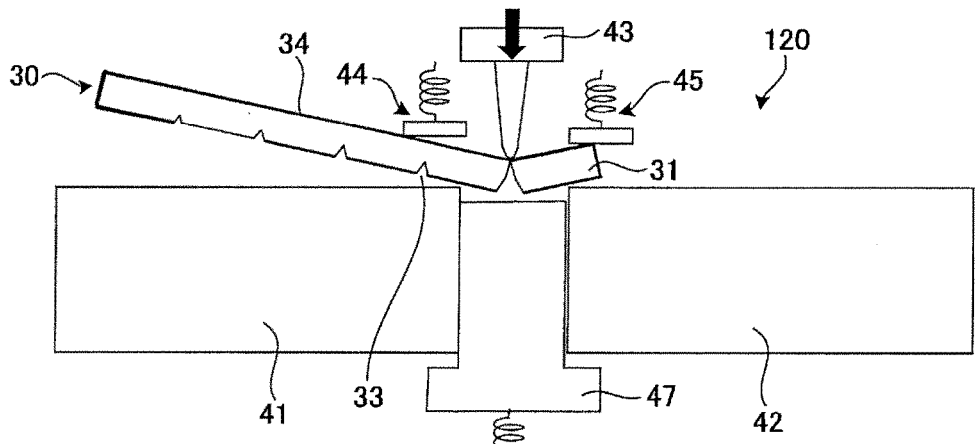
FIG. 8B is a diagram showing the cleaving process of the magnet segment manufacturing apparatus in the first embodiment.

As shown in FIG. 8B, a punch 43 is lowered to strongly press the scheduled cleaving part of the magnetic body 30. At this time, a moment for making the magnetic body 30 convex downward acts on the magnetic body 30 by three-point bending of the punch 43 and the pair of dies 41, 42 supporting the magnetic body 30, thereby causing a crack from the incision 33 to an upper side to cleave the magnetic body 30. Further, the die cushion 47 is retracted downwardly by a downward pressing force of the punch 43. At this point of time, the magnetic body 30 is cleaved, but the coating 34 is not cut yet.

Figure 8C:
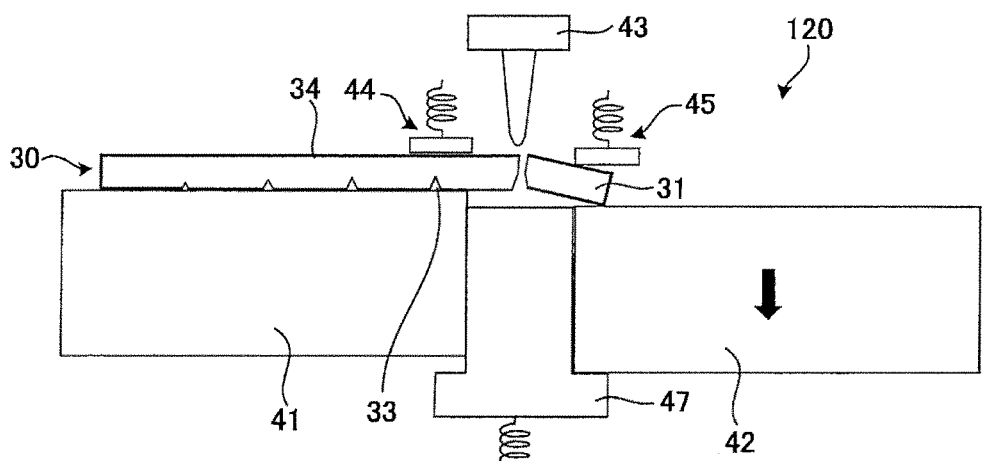
FIG. 8C is a diagram showing the cleaving process of the magnet segment manufacturing apparatus in the first embodiment.

As shown in FIG. 8C, the die 42 on a right side in FIG. 8C (front side in the conveying direction of the magnetic body 30) is lowered after the cleaving of the magnetic body 30. At this time, plate-like parts 44a, 45a of magnet pressers 44, 45 lowered together with the punch 43 are pressed at two points on the upper surface of the magnetic body 30 and at opposite sides of the punch 43. The magnet presser 44 on a left side in FIG. 8C (rear side in the conveying direction) presses the uncleaved magnetic body 30 against the die 41 and the magnet presser 45 on the right side in FIG. 8C biases the magnet segment 31 downwardly. Since the die 42 on the right side in FIG. 8C is lowered, a moment in a direction opposite to that at the time of cleaving acts on the magnetic body 30.

In this way, a force acts on the upper surface of the cleaving part of the magnetic body 30 in a direction to pull apart a part of the coating 34 on the upper surface of the magnet segment 31 and a part thereof on the upper surface of the uncleaved magnetic body 30, and the coating 34 is cut along the scheduled cleaving part.

Thereafter, the cleaved magnet segment 31 is clamped by carrying claws 48 from the opposite widthwise sides of the magnetic body 30 as shown in FIG. 7A and conveyed in the conveying direction as shown in FIG. 7B.

As just described, since the die 42 on the front side in the conveying direction is lowered after the cleaving of the magnetic body 30, the moment in the direction opposite to that at the time of cleaving can be caused to act on the magnetic body 30 and a conveyance failure can be prevented by more reliably cutting the coating 34.

Next, a second embodiment is described.

A magnet segment manufacturing apparatus 210 of the present embodiment fixes an uncleaved magnetic body 30 after the cleaving of the magnetic body 30 and cuts a coating 34 by conveying a cleaved magnet segment 31 in a direction to be pulled apart from the uncleaved magnetic body 30.

Figure 9A:
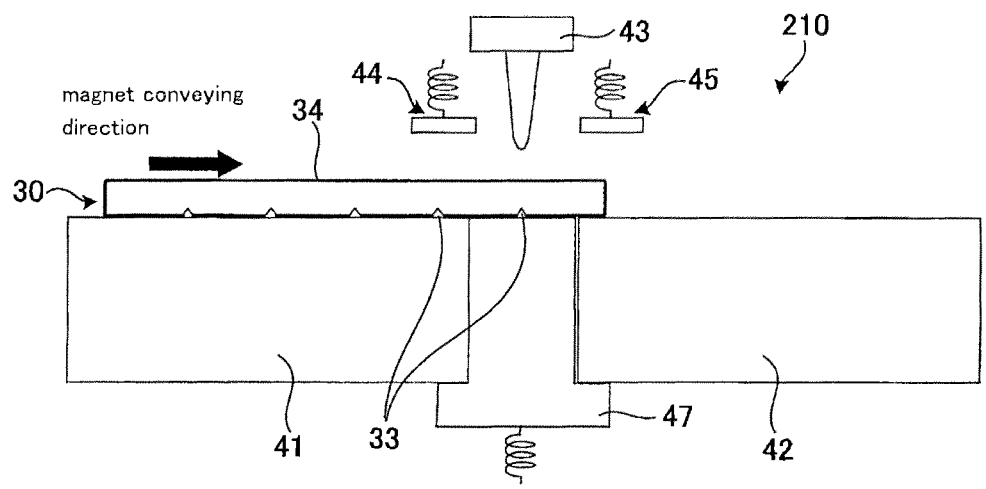
FIG. 9A is a diagram showing the conveyance of a magnet segment after cleaving in a second embodiment.

A process until the magnetic body 30 is cleaved is similar to that of the first embodiment shown in FIGS. 8A and 8B. Specifically, as shown in FIG. 9A, the magnetic body 30 is conveyed rightward in FIG. 9A until a incision 33 provided on the lower surface of the magnetic body 30 comes to be located in the center between a pair of dies 41, 42.

Figure 9B:
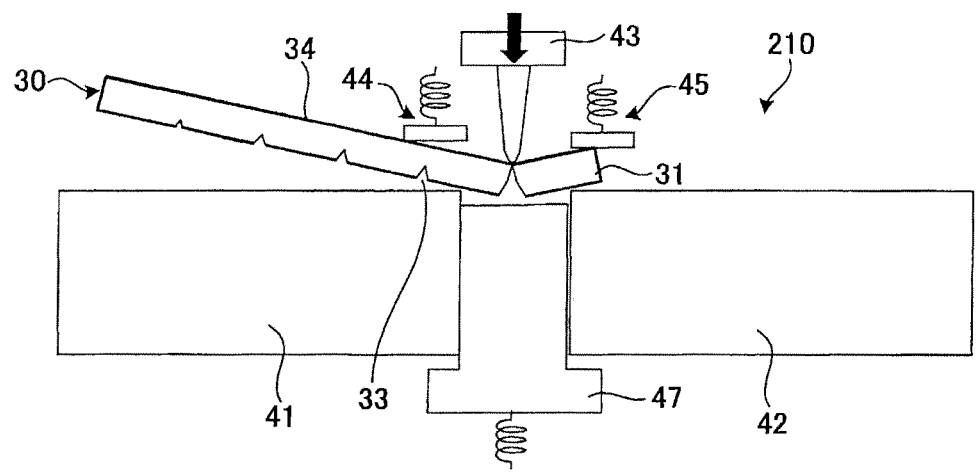
FIG. 9B is a diagram showing the conveyance of the magnet segment after cleaving in the second embodiment.

As shown in FIG. 9B, a punch 43 is lowered to strongly press a scheduled cleaving part of the magnetic body 30. In this way, the magnetic body 30 is cracked upwardly from the incision 33 to be cleaved. Further, a die cushion 47 is retracted downwardly by a downward pressing force of the punch 43. At this point of time, the magnetic body 30 is cleaved, but the coating 34 is not cut yet.

Figure 10A:
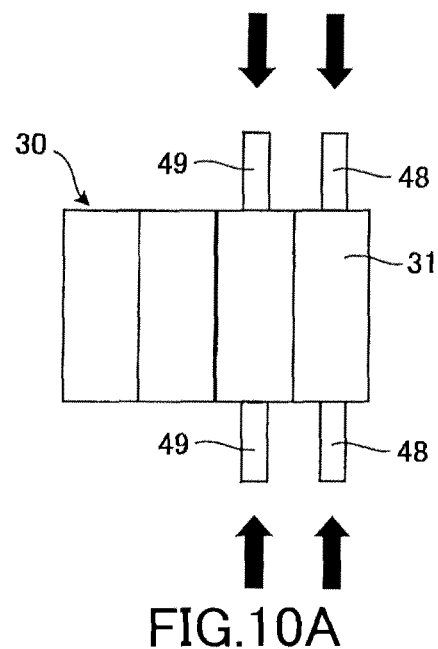
FIG. 10A is a diagram showing the conveyance of the magnet segment after cleaving in the second embodiment.
Figure 10B:
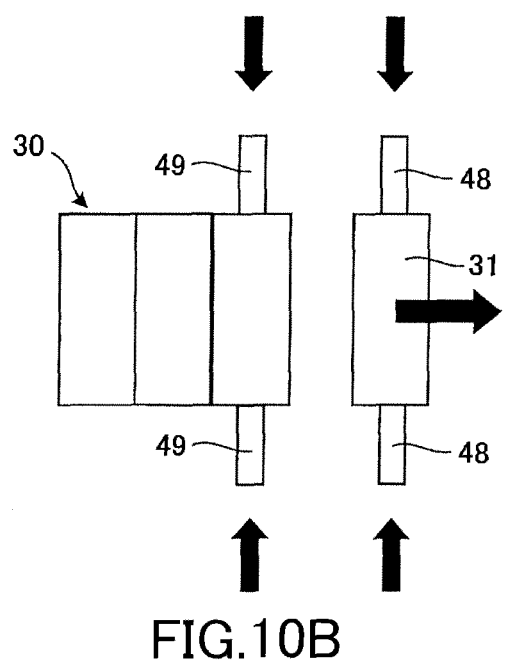
FIG. 10B is a diagram showing the conveyance of the magnet segment after cleaving in the second embodiment.

As shown in FIG. 10A, a magnet segment 31 after cleaving is clamped by carrying claws 48 from opposite widthwise sides after the magnetic body 30 is cleaved. Further, the uncleaved magnetic body 30 is clamped by carrying claws 49 from opposite widthwise sides independently of the magnet segment 31. In this state, the carrying claws 48 clamping the magnet segment 31 are conveyed in a conveying direction as shown in FIG. 10B.

In this way, a force acts on the upper surface of the cleaving part of the magnetic body 30 in a direction to pull apart a part of the coating 34 on the upper surface of the magnet segment 31 and a part thereof on the upper surface of the uncleaved magnetic body 30, and the coating 34 is cut along the scheduled cleaving part. At this time, the uncleaved magnetic body 30 is not conveyed together with the magnet segment 31 since being fixed by the carrying claws 49.

As just described, since the magnet segment 31 and the uncleaved magnetic body 30 are respectively independently fixed after the magnetic body 30 is cleaved and the magnet segment 31 is conveyed in the direction to be pulled apart from the uncleaved magnetic body 30, the magnet segment 31 can be separated from the uncleaved magnetic body 30. Thus, it can be prevented that a production facility is temporarily stopped due to a conveyance failure of the magnet segment 31.

Further, since the magnet segment 31 and the uncleaved magnetic body 30 are respectively fixed from the opposite widthwise sides by the independent carrying claws 48, 49, the coating 34 can be more reliably torn and the conveyance failure of the magnet segment 31 can be prevented.

Here, the carrying claws 49 for clamping the uncleaved magnetic body 30 are provided in FIGS. 10A and 10B to cut the coating 34 at the time of cleaving the magnetic body 30.

However, it is also possible to employ a magnet segment manufacturing apparatus 220 configured as follows instead of this.

In this magnet segment manufacturing apparatus 220, a die cushion 47 includes an air hole 50 having an opening 50*a* on the upper surface of the die cushion 47. The air hole 50 is connected to an unillustrated pump for evacuating the interior of the air hole 50 and the air hole 50 in a vacuum state chucks the magnetic body 30 facing the opening 50*a*.

Figure 11A:
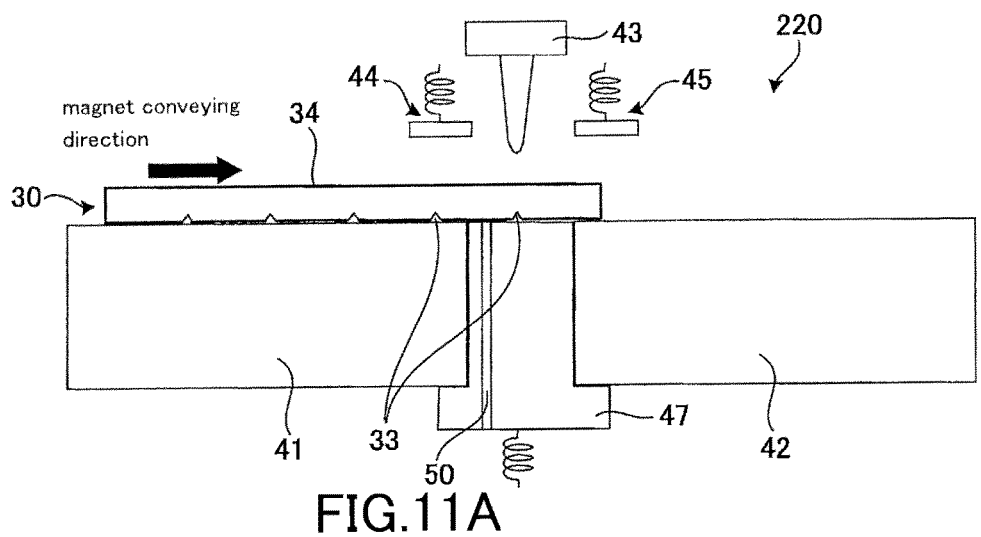
FIG. 11A is a diagram showing a cleaving process of a magnet segment manufacturing apparatus in the second embodiment.
Figure 11B:
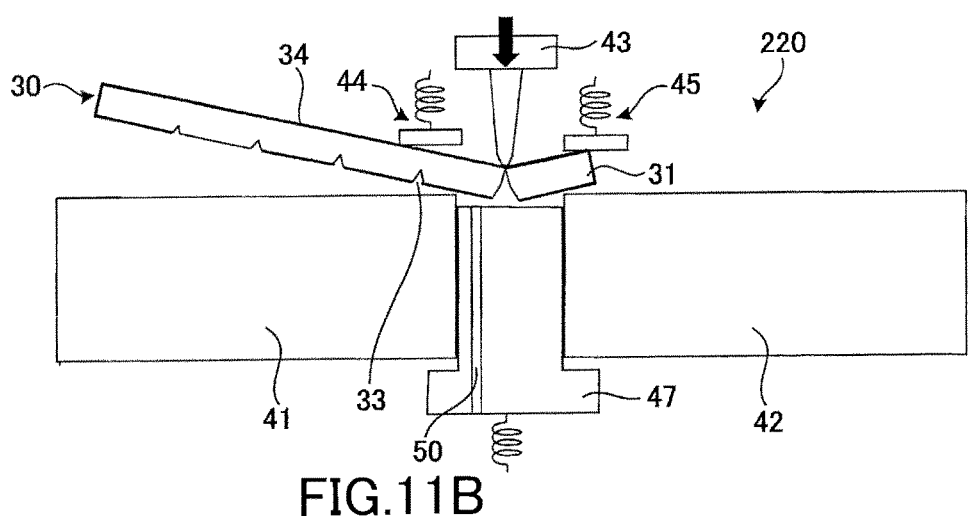
FIG. 11B is a diagram showing the cleaving process of the magnet segment manufacturing apparatus in the second embodiment.

A process until the magnetic body 30 is cleaved is similar to that shown in FIGS. 9A and 9B (FIGS. 11A, 11B).

Figure 11C:
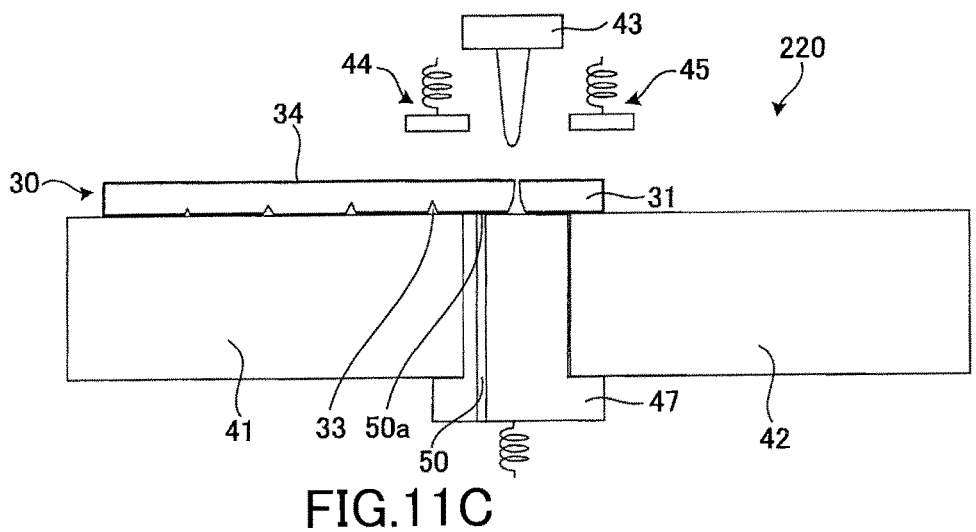
FIG. 11C is a diagram showing the cleaving process of the magnet segment manufacturing apparatus in the second embodiment.

As shown in FIG. 11C, when the die cushion 47 is elevated by a spring force and comes into contact with the lower surface of the magnetic body 30, the opening 50*a* of the air hole 50 comes into contact with the lower surface of the uncleaved magnetic body 30. Further, when the air hole 50 is evacuated, a pressure in the air hole 50 is reduced and the uncleaved magnetic body 30 is sucked to the die cushion 47 to be chucked.

Figure 12A:
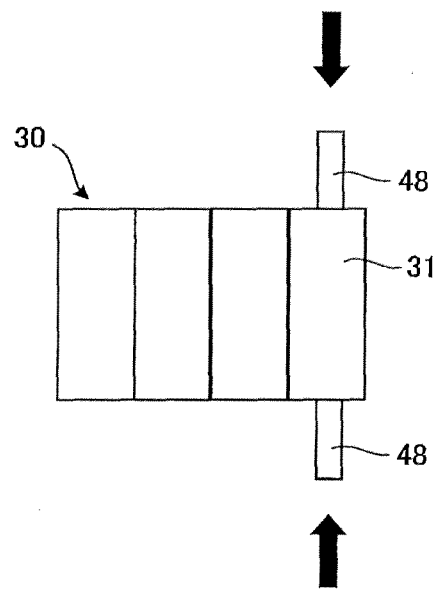
FIG. 12A is a diagram showing the conveyance of the magnet segment after cleaving in the second embodiment.
Figure 12B:
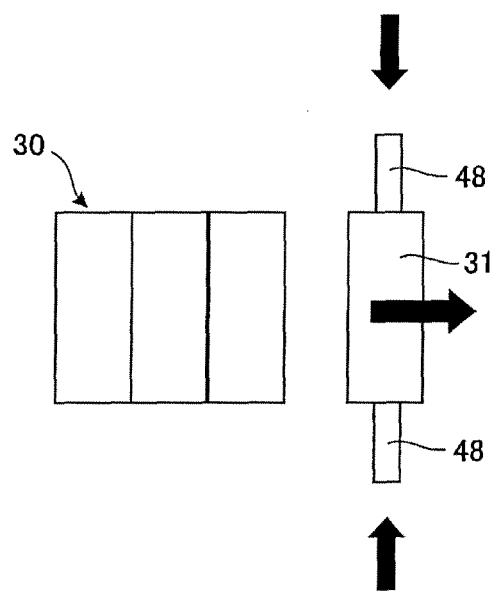
FIG. 12B is a diagram showing the conveyance of the magnet segment after cleaving in the second embodiment.

Thereafter, the cleaved magnet segment 31 is clamped by carrying claws 48 from opposite widthwise sides of the magnetic body 30 as shown in FIG. 12A and conveyed in the conveying direction as shown in FIG. 12B. In this way, a force acts on the upper end of the cleaving part of the magnetic body 30 in a direction to pull apart a part of the coating 34 on the upper surface of the magnet segment 31 and a part thereof on the upper surface of the uncleaved magnetic body 30, and the coating 34 is torn along the scheduled cleaving part. At this time, the uncleaved magnetic body 30 is not conveyed together with the magnet segment 31 since being sucked to the die cushion 47.

As just described, since the magnet segment 31 and the uncleaved magnetic body 30 are respectively independently fixed after the magnetic body 30 is cleaved and the magnet segment 31 is conveyed in the direction to be pulled apart from the uncleaved magnetic body 30, the coating 34 still connected after cleaving can be torn. Thus, it can be prevented that a production facility is temporarily stopped due to a conveyance failure of the magnet segment 31.

Further, by chucking the uncleaved magnetic body 30 to the die cushion 47 after cleaving to fix the magnetic body 30, the uncleaved magnetic body 30 can be more reliably fixed, the coating 34 can be torn, and the conveyance failure of the magnet segment 31 can be prevented.

Further, here, the air hole 50 for sucking the uncleaved magnetic body 30 is provided in FIG. 11C to cut the coating 34 at the time of cleaving the magnetic body 30. However, it is also possible to employ a magnet segment manufacturing apparatus 230 configured as follows instead of this.

In this magnet segment manufacturing apparatus 230, a magnet presser on a rear side in the conveying direction presses the magnetic body 30 downwardly without being elevated together with a punch 43 when the punch 43 is retracted upwardly after the magnetic body 30 is cleaved.

Figure 13A:
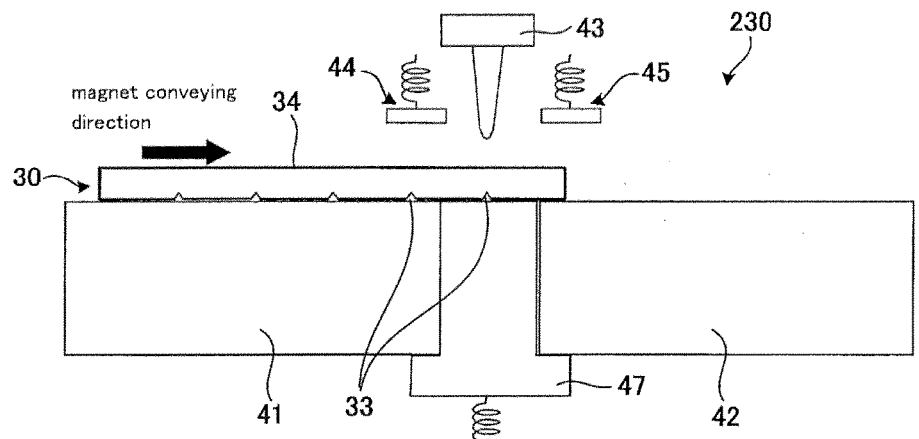
FIG. 13A is a diagram showing a cleaving process of a magnet segment manufacturing apparatus in the second embodiment.
Figure 13B:
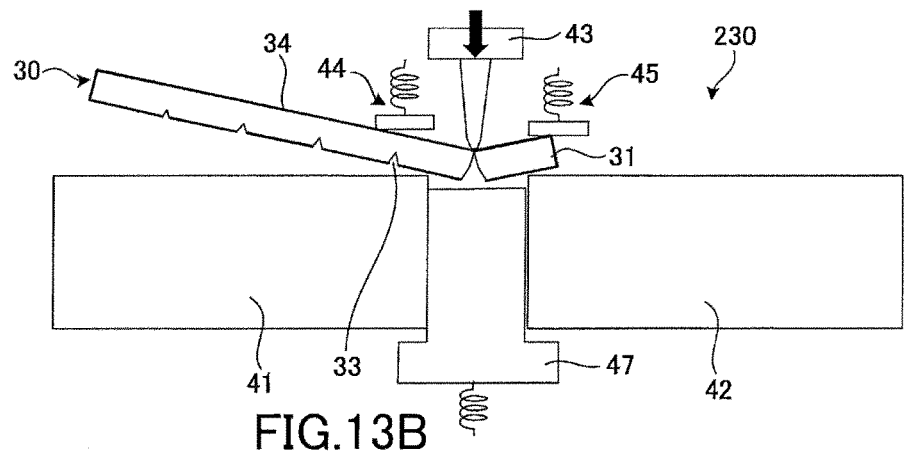
FIG. 13B is a diagram showing the cleaving process of the magnet segment manufacturing apparatus in the second embodiment.

A process until the magnetic body 30 is cleaved is similar to that shown in FIGS. 9A and 9B (FIGS. 13A, 13B).

Figure 13C:
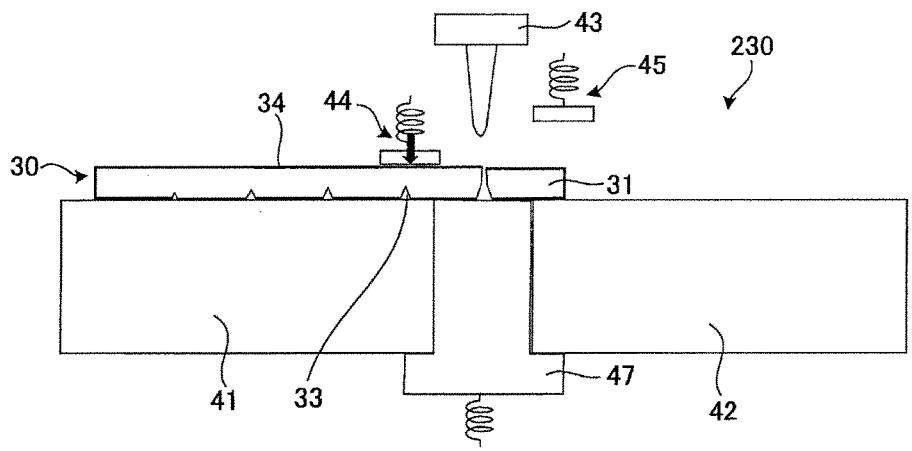
FIG. 13C is a diagram showing the cleaving process of the magnet segment manufacturing apparatus in the second embodiment.

As shown in FIG. 13C, as the punch 43 is elevated, the magnet presser 45 on a front side in the conveying direction is elevated together with the punch 43, but the magnet presser 44 on the rear side in the conveying direction presses the uncleaved magnetic body 30 downwardly.

Thereafter, the cleaved magnet segment 31 is clamped by carrying claws 48 from opposite widthwise sides of the magnetic body 30 as shown in FIG. 12A and conveyed in the conveying direction as shown in FIG. 12B. In this way, a force acts on the upper surface of the cleaving part of the magnetic body 30 in a direction to pull apart a part of the coating 34 on the upper surface of the magnet segment 31 and a part thereof on the upper surface of the uncleaved magnetic body 30, and the coating 34 is torn along the scheduled cleaving part. At this time, the uncleaved magnetic body 30 is not conveyed together with the magnet segment 31 since being pressed against the die 41 by the magnet presser.

As just described, since the uncleaved magnetic body 30 is fixed by being pressed downwardly by the magnet presser 44 on the rear side in the conveying direction after cleaving, the uncleaved magnetic body 30 can be more reliably fixed, the coating 34 can be torn and a conveyance failure of the magnet segment 31 can be prevented.

Next, a third embodiment is described.

In the present embodiment, a coating 34 is cut by a movement of a punch 43 when a magnetic body 30 is cleaved. A main configuration of a magnet segment manufacturing apparatus 310 is similar to the second embodiment, but a stopper 51 for receiving a cleaved magnet segment 31 is provided instead of the magnet presser 45 on the front side in the conveying direction in the present embodiment.

The stopper 51 is formed of an elastic member capable of alleviating an impact when the magnet segment 31 is received. Alternatively, a shock-absorbing member may be provided on a part for receiving the magnet segment 31. Further, the magnet segment manufacturing apparatus 310 includes a detection sensor 52 for detecting the passage of the magnet segment 31 cleaved and jumping out.

Figure 14A:
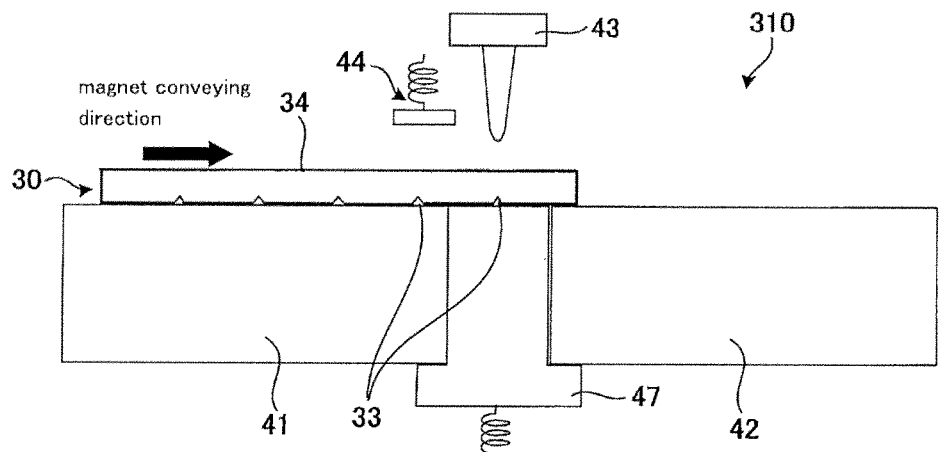
FIG. 14A is a diagram showing a cleaving process of a magnet segment manufacturing apparatus in a third embodiment.
Figure 14B:
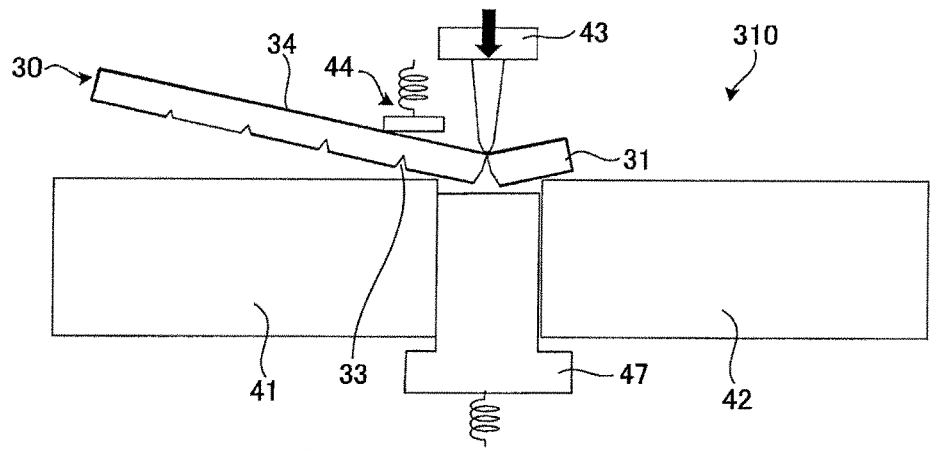
FIG. 14B is a diagram showing the cleaving process of the magnet segment manufacturing apparatus in the third embodiment.
Figure 14C:
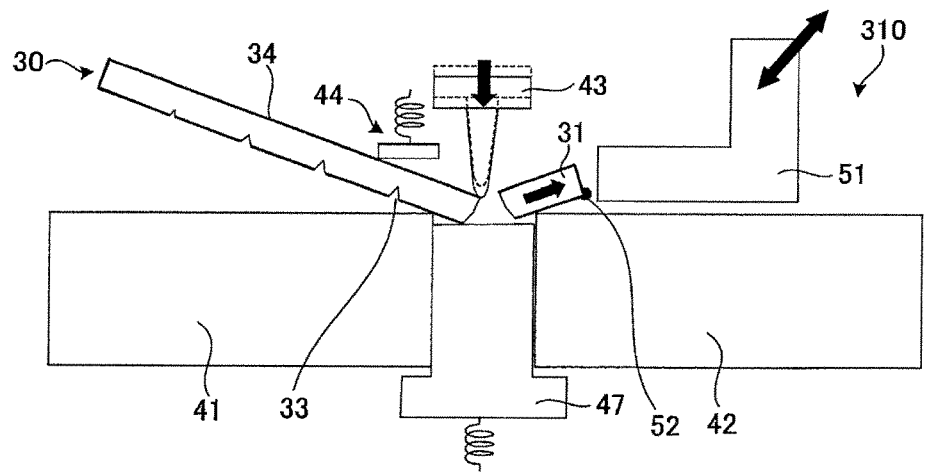
FIG. 14C is a diagram showing the cleaving process of the magnet segment manufacturing apparatus in the third embodiment.

A process until the magnetic body 30 is cleaved is similar to that of the second embodiment shown in FIGS. 9A and 9B (FIGS. 14A, 14B). After the magnetic body 30 is cleaved, the punch 43 is pressed further downwardly as shown in FIG. 14C. This increases a bending amount of the coating 34 on the upper surface of a cleaving part, whereby the coating 34 is cut.

That is, the punch 43 strokes in two stages in cleaving the magnetic body 30 and the movement of the punch 43 is composed of two-stage motions to cleave the magnetic body 30 by a lowering motion in the first stage (FIG. 14B) and cut the coating 34 by a lowering motion in the second stage (FIG. 14C).

When the coating 34 is cut by the lowering motion in the second stage of the punch 43, the cleaved magnet segment 31 is flipped and jumps out in the conveying direction. This causes the detection sensor 52 to detect the passage of the magnet segment 31 and the lowering motion of the punch 43 is stopped. The jumping out magnet segment 31 is received by the stopper 51, which is then retracted to an oblique upper side in FIG. 14C to be retracted from a conveyance path for the magnet segment 31.

As just described, since the punch 43 is further lowered after the magnetic body 30 is cleaved, the coating 34 still connected after cleaving can be cut by the punch 43. Thus, it can be prevented that a production facility is temporarily stopped due to a conveyance failure of the magnet segment 31.

Further, since the punch 43 cleaves the magnetic body 30 by the lowering motion in the first stage and, thereafter, cuts the coating 34 by the lowering motion in the second stage, an abnormal crack of the magnetic body 30 due to an over-stroke of the punch 43 does not occur.

Furthermore, since the lowering motion of the punch 43 is stopped upon detecting the passage of the magnet segment 31 by the detection sensor 52, a cycle time loss caused by the two-stage motions of the punch 43 can be reduced.

Furthermore, since the magnet segment 31 jumping out after the coating 34 is cut is received by the stopper 51, the flying of the magnet segment 31 can be prevented and the magnet segment 31 can be properly conveyed.

Here, the movement of the punch 43 is composed of two-stage motions in FIG. 14C to cut the coating 34 at the time of cleaving the magnetic body 30. However, it is also possible to employ a magnet segment manufacturing apparatus 320 configured as follows instead of this.

In this magnet segment manufacturing apparatus 320, a punch 43 is caused to wait for a predetermined cutting time at a bottom dead center position at the time of cleaving. The cutting time is a time during which the coating 34 can be reliably cut and, for example, set at 1 sec.

Figure 15A:
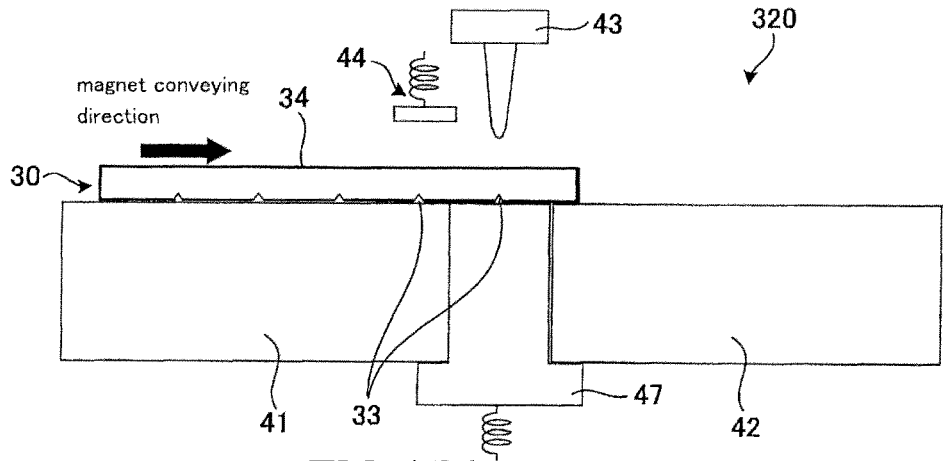
FIG. 15A is a diagram showing a cleaving process of a magnet segment manufacturing apparatus in the third embodiment.
Figure 15B:
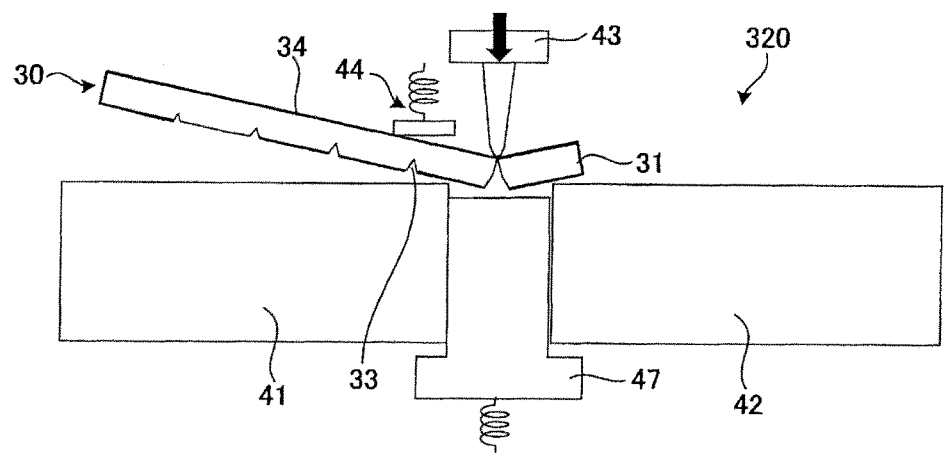
FIG. 15B is a diagram showing the cleaving process of the magnet segment manufacturing apparatus in the third embodiment.
Figure 15C:
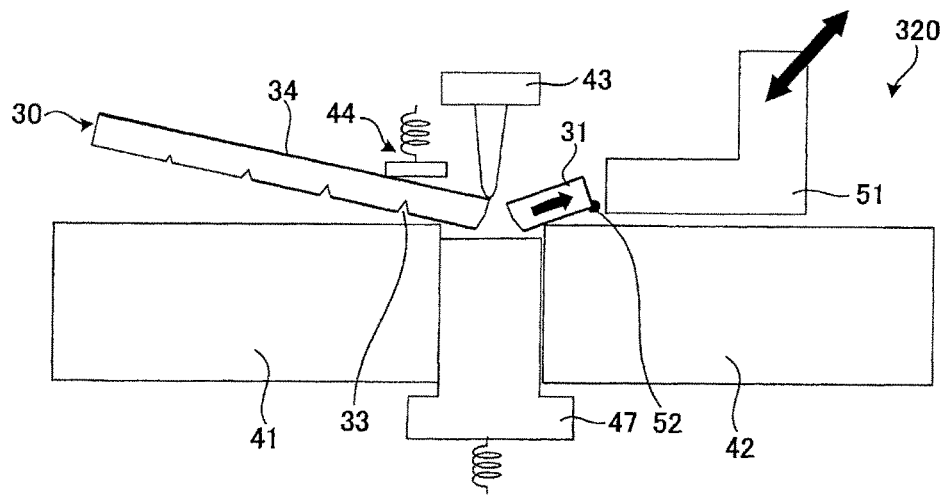
FIG. 15C is a diagram showing the cleaving process of the magnet segment manufacturing apparatus in the third embodiment.

A process until the magnetic body 30 is cleaved is similar to that shown in FIGS. 14A and 14B (FIGS. 15A, 15B). While the punch 43 is stopped at the bottom dead center position as shown in FIG. 15C after the magnetic body 30 is cleaved, a bending force continues to act on the coating 34. Thus, even if the punch 43 is not further lowered as described above, the coating 34 can be cut if the punch 43 waits for the cutting time.

When the coating 34 is cut, the magnet segment 31 jumps out in the conveying direction to be detected by the detection sensor 52. When the magnet segment 31 is detected, the waiting of the punch 43 at the bottom dead center position is ended even if the cutting time has not elapsed yet.

As just described, since the punch 43 is caused to wait at the bottom dead center position after the magnetic body 30 is cleaved, the coating 34 still connected after cleaving can be cut by a bending force acting on the coating 34. Thus, it can be prevented that a production facility is temporarily stopped due to a conveyance failure of the magnet segment 31.

Further, since the punch 43 is caused to wait at the bottom dead center position where the magnetic body 30 is cleaved, an abnormal crack of the magnetic body 30 due to an over-stroke of the punch 43 does not occur.

Furthermore, since the waiting of the punch 43 at the bottom dead center position is ended when the passage of the magnet segment 31 is detected by the detection sensor 52, a cycle time loss caused by the waiting of the punch 43 can be reduced.

Here, it is detected by the detection sensor 52 in FIGS. 14C and 15C that the coating 34 has been cut and the magnet segment 31 has jumped out. However, it is also possible to employ a magnet segment manufacturing apparatus 330 configured as follows instead of this.

Figure 16:
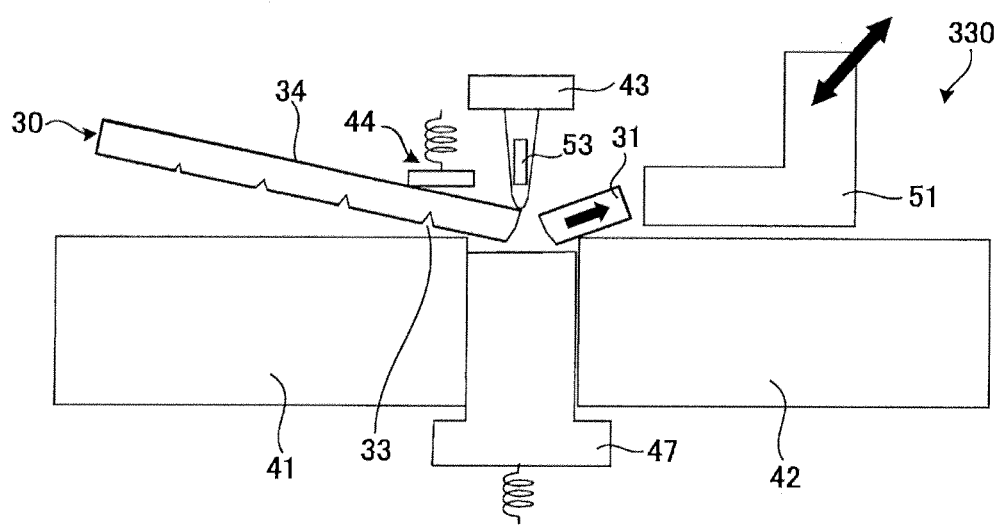
FIG. 16 is a diagram showing a cleaving process of a magnet segment manufacturing apparatus provided with a load cell.

In this magnet segment manufacturing apparatus 330, a load cell (load converter) 53 is attached to a punch 43 as shown in FIG. 16 and a load applied to the punch 43 is monitored. Further, when the load detected by the load cell 53 drops to or below a cutting determination load (e.g. zero), it is determined that the coating 34 has been cut and the two-stage motions of the punch 43 or the waiting thereof at the bottom dead center position is ended.

As just described, since the two-stage motions of the punch 43 or the waiting thereof at the bottom dead center position is ended when the cutting of the coating 34 is detected by the load cell 53, a cycle time loss caused by the two-stage motions of the punch 43 or the waiting thereof at the bottom dead center position can be reduced.

Although the embodiments of the present invention have been described above, the above embodiments are merely application examples of the present invention and the technical scope of the present invention is not limited to the specific configurations of the above embodiments. Various changes can be made without departing from the gist of the present invention.

Figure 17:
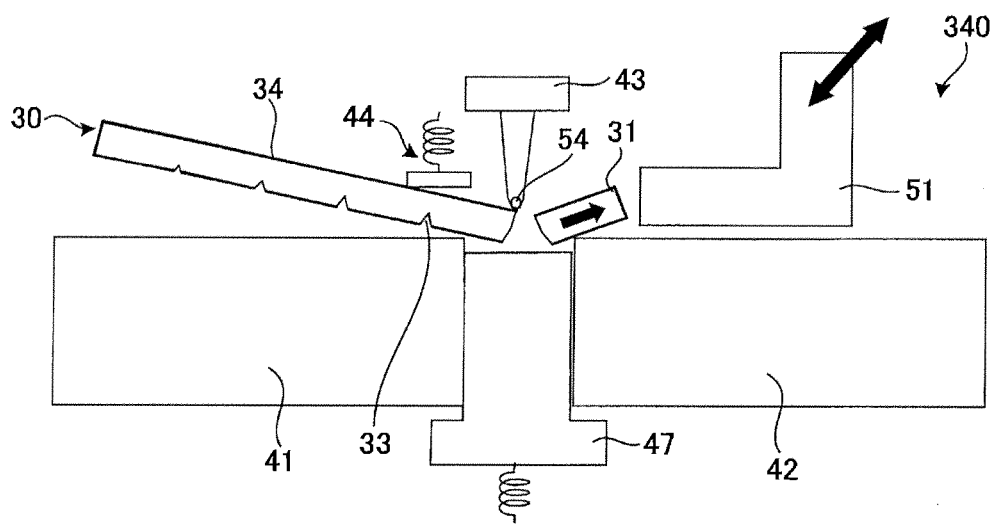
FIG. 17 is a diagram showing a cleaving process of a magnet segment manufacturing apparatus provided with a heater.

For example, in the above first to third embodiments, the coating 34 is cut by the movement(s) of the die cushion 47, the carrying claws 48, 49 or the punch 43 after the magnetic body is cleaved. In addition to this, a heater 54 may be provided in the punch 43 as shown in FIG. 17 and the coating 34 held in contact with a tip part of the punch 43 may be melted and cut or burnt or cut by heating the punch 43 at the time of cleaving the magnetic body.

In this way, the coating 34 still connected after cleaving can be more reliably cut and it can be prevented that a production facility is temporarily stopped due to a conveyance failure of the magnet segment 31.

Further, by appropriately combining the above first to third embodiments, the coating 34 can be more reliably cut.

The present application claims a priority of Japanese Patent Application No. 2012-148318 filed with the Japan Patent Office on Jul. 2, 2012, all the contents of which are hereby incorporated by reference.

The invention claimed is:

1. A segment manufacturing apparatus for cutting an object placed on the apparatus, the apparatus comprising:
    two placing tables that are aligned apart so as to provide a gap between the two placing tables, the two placing tables having supporting faces provided in a same plane respectively, the supporting faces being configured to support the object respectively in a bridge state;
    a first mechanism configured to bend the object including a first pressing unit provided above the gap and configured to press an upper part of the object downwards so that a lower part of the object is pushed in the gap; and
    a second mechanism configured to bend the object including
        a pushing unit provided in the gap, the pushing unit configured to push upwards on the object so as to lift the object above the supporting faces of the two placing tables, and
        second pressing units located above the two placing tables, respectively, the second pressing units configured to press the object downwards.

2. The segment manufacturing apparatus according to claim 1, wherein
    the first pressing unit is configured to press the object downwards toward the gap so as to bend the object.

3. The segment manufacturing apparatus according to claim 1, wherein
    the pushing unit is configured to push the object upwards, and the second pressing units are configured to push the object downwards toward the placing tables at the same time.

4. The segment manufacturing apparatus according to claim 1, wherein
    the pushing unit is configured to push the object upwards above the plane in which the supporting faces are provided, and
    the two placing tables are configured to lower such that the pushing unit moves upwards above the plane in a relative manner.

5. The segment manufacturing apparatus according to claim 1, wherein
    the object comprises a coating applied to an upper surface thereof and an incision formed on a lower surface thereof.

6. The segment manufacturing apparatus according to claim 1, wherein
the first mechanism is configured to cleave the object,
the pushing unit includes a projecting part having a tip that projects further, in an opposite direction, than supporting faces of the two placing tables; and
the second mechanism is configured to apply a moment in the opposite direction by pressing the object, which has been cleaved, in the opposite direction with the projecting part of the pushing unit in a state where lift of the object is regulated by the second pressing units.

7. The segment manufacturing apparatus according to claim 1, wherein
the first mechanism is configured to cleave the object, and
one of the two placing tables on a side where the object is placed is configured to lower so as to apply a moment in an opposite direction after the object is cleaved.

8. The segment manufacturing apparatus according to claim 1, wherein
the pushing unit comprises a die cushion.

9. The segment manufacturing apparatus according to claim 1, wherein
the first pressing unit comprises a punch.

* * * * *